United States Patent [19]

Mark et al.

[11] Patent Number: 4,474,999

[45] Date of Patent: Oct. 2, 1984

[54] PHENOL COMPOUNDS, PROCESS AND POLYMERS

[75] Inventors: Victor Mark, Evansville; Charles V. Hedges, Mt. Vernon, both of Ind.

[73] Assignee: General Electric Company, Mt. Vernon, Ind.

[21] Appl. No.: 542,527

[22] Filed: Oct. 17, 1983

Related U.S. Application Data

[62] Division of Ser. No. 360,042, Mar. 19, 1982.

[51] Int. Cl.$^3$ ............................................. C07C 39/15
[52] U.S. Cl. ................................................... 568/720
[58] Field of Search ........................................ 568/720

[56] References Cited

U.S. PATENT DOCUMENTS

| | | | |
|---|---|---|---|
| 3,013,087 | 12/1961 | Schwarzer | 568/720 |
| 3,281,478 | 10/1966 | Farnham | 568/720 |
| 3,288,864 | 11/1966 | Farnham | 568/720 |
| 3,644,538 | 2/1972 | Starnes | 568/720 |
| 4,110,540 | 8/1978 | Freitag et al. | 568/720 |
| 4,146,739 | 3/1979 | Akutin et al. | 568/720 |
| 4,201,877 | 5/1980 | Yamazaki et al. | 568/720 |
| 4,337,367 | 6/1982 | Kanagawa et al. | 568/720 |
| 4,408,086 | 10/1983 | Matsushima et al. | 568/720 |
| 4,415,723 | 11/1983 | Hedges et al. | 568/720 |
| 4,415,724 | 11/1983 | Mark et al. | 568/720 |
| 4,415,725 | 11/1983 | Hedges et al. | 568/720 |

FOREIGN PATENT DOCUMENTS

| | | | |
|---|---|---|---|
| 859456 | 1/1961 | United Kingdom | 568/720 |
| 883033 | 11/1961 | United Kingdom | 568/720 |

*Primary Examiner*—Werren B. Lone
*Attorney, Agent, or Firm*—Martin B. Barancik

[57] ABSTRACT

This invention relates to phenolic compounds that have utility as branching agents for the manufacture of randomly branched polycarbonates.

5 Claims, No Drawings

PHENOL COMPOUNDS, PROCESS AND POLYMERS

This is a division of copending application Ser. No. 360,042, filed Mar. 19, 1982.

This invention relates to tetraphenolic compounds that have utility as branching agents for the manufacture of novel randomly branched polycarbonates. These randomly branched polycarbonates have thermal resistance, light stability, enhanced hydrolytic stability and high melt strength as compared to other branched polycarbonates. These desirable properties make the novel branched polycarbonates particularly useful for the fabrication of blow molded articles although they may be employed for diverse molding applications.

BACKGROUND OF THE INVENTION

Polycarbonates are well known, commercially important materials which are produced in large quantities. Such polymers are typically prepared by reacting a carbonate precursor with a dihydric phenol to provide a linear polymer consisting of units of the dihydric phenol linked to one another through carbonate linkages. These polymers have outstanding mechanical, thermal, and optical properties such as high tensile strength, optical clarity (transparency), thermal and dimensional stability and impact strength.

These aromatic polycarbonates differ from most thermoplastic polymers in their melt rheology behavior. Most thermoplastic polymers exhibit non-Newtonian flow characteristics over essentially all melt processing conditions. Newtonian flow is defined as the type of flow occurring in a liquid system where the rate of shear is directly proportional to the shearing force. However, in contrast to most thermoplastic polymers, polycarbonates prepared from dihydric phenols exhibit Newtonian flow at normal processing temperatures and shear rates below 300 reciprocal seconds.

Two other characteristics of molten thermoplastic polymers are considered to be significant for molding operations: melt elasticity and melt strength. Melt elasticity is the recovery of the elastic energy stored within the melt from distortion or orientation of the molecules by shearing stresses. Melt strength may be simply described as the tenacity of a molten strand and indicates the ability of the melt to support a stress. Both of these characteristics are important in extrusion blow molding, particularly in fabrication by extrusion blow molding. Non-Newtonian flow characteristics tend to impart melt elasticity and melt strength to polymers thus allowing their use in blow molding fabrication. In the usual blow molding operation, a tube of a molten thermoplastic is extruded vertically downward into a mold, followed by the introduction of a gas, such as air, into the tube thus forcing the molten plastic to conform to the shape of the mold. The length of the tube and the quantity of material forming the tube are limiting factors in determing the size and wall thickness of the object that can be molded by this process. The fluidity of the melt obtained from bisphenol-A polycarbonate, or the lack of melt strength as well as the paucity of extrudate swelling, serve to limit blow molding applications to relatively small, thin walled parts. Temperatures must generally be carefully controlled to prevent the extruded tube from falling away before it attains the desired length and the mold is closed around it for blowing. Consequently, the Newtonian behavior of polycarbonate resin melts has severely restricted their use in the production of large hollow bodies by conventional extrusion blow molding operations as well as the production of various other shapes by profile extrusion methods.

Thermoplastic randomly branched polycarbonates exhibit unique properties of non-Newtonian flow, melt elasticity and melt strength which permit them to be used to obtain such articles as bottles which were not heretofore easily or readily produced with linear polycarbonates. The thermoplastic randomly branched polycarbonates can be prepared by reacting a tetraphenolic compound with a dihydric phenol and a carbonate precursor.

DESCRIPTION OF THE INVENTION

The invention contemplates tetraphenolic compounds of the formula:

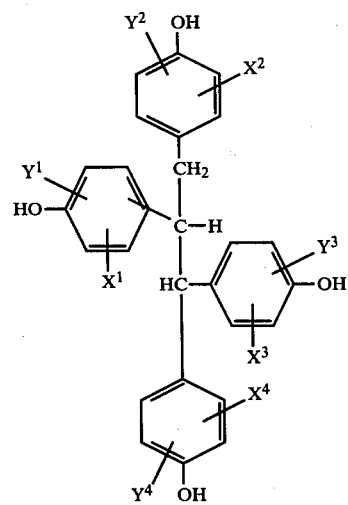

wherein $X^1$, $X^2$, $X^3$, $X^4$, $Y^1$, $Y^2$, $Y^3$, and $Y^4$ are independently selected from hydrogen, chlorine, bromine, alkyl of from 1 to 6 carbon atoms and aryl.

The preferred compounds are of the formula:

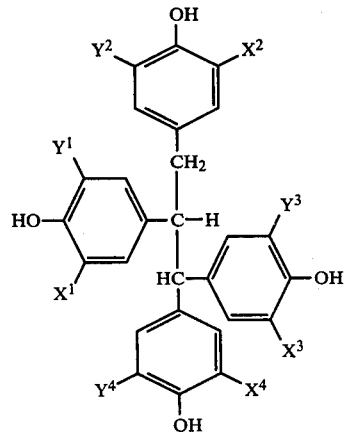

where $X^1$, $X^2$, $X^3$, $X^4$, $Y^1$, $Y^2$, $Y^3$, and $Y^4$, are the same as defined hereinabove.

The term alkyl of from 1 to 6 carbon atoms is used to include a straight and branched hydrocarbon groups such as methyl, ethyl, n-propyl, i-propyl, sec-butyl, n-hexyl and the like. The term aryl is used to include naphthyl, phenyl and alkyl substituted derivatives thereof.

Preferred tetraphenolic compounds include:
1,1,2,3-tetrakis(3,5-dimethyl-4-hydroxyphenyl)propane
1,1,2,3-tetrakis(4-hydroxyphenyl)propane
1,1,2,3-tetrakis(3-methyl-4-hydroxyphenyl)propane.

The process of the invention may be utilized to prepare phenolic compounds other than the tetraphenolic compounds described hereinabove. These phenolic compounds are of the formula:

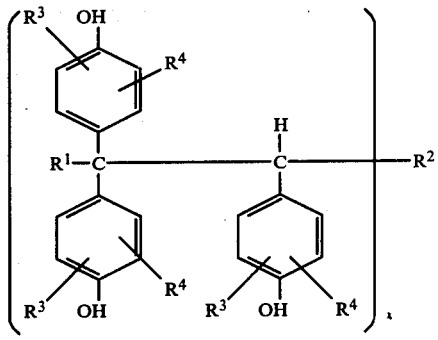

wherein when x is 1, $R^1$ is hydrogen; $R^2$ is selected from the group consisting of hydrogen, alkyl, alkaryl, aryl, aralkyl, haloalkyl, hydroxyaryl, haloaryl, haloalkaryl, alkylhaloaryl, haloaralkyl, alkylhaloaryl, haloalkylhaloaryl, arylhaloalkyl or

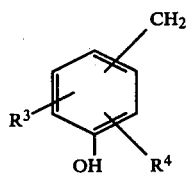

wherein $R^3$ and $R^4$ on each ring may be independently selected from the group consisting of hydrogen, chlorine, bromine, alkyl of from 1 to 6 carbon atoms and aryl; when x is 2, $R^2$ is $(-CH_2-)_n$ wherein n is an integer of from 1 to 6. The process is carried out by reacting a compound of formula II:

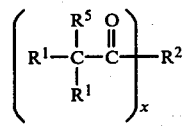

wherein $R^1$, $R^2$ and x are the same as hereinabove defined and $R^5$ is hydroxy, alkoxy, aryloxy, $-OC(O)R$ wherein R is alkyl or aryl, chlorine or bromine; with a phenolic compound or mixture of compounds of formula III:

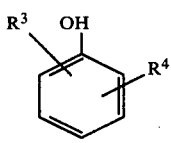

wherein $R^3$ and $R^4$ are the same as hereinabove defined in the presence of a halogen acid. The term alkaryl is used herein to include groups which have a phenyl or naphthyl ring that is substituted with one or more alkyl groups of from 1 to 6 carbon atoms such as 4-methylphenyl, 2-ethylphenyl, 2,6-dimethylphenyl, 2-methylnaphthyl and the like. The term aryl is used to include phenyl and naphthyl. The term aralkyl is used to include groups in which an alkyl group of 1 to 6 carbon atoms is substituted with a phenyl or naphthyl group such as benzyl, phenethyl, and the like. The term haloalkyl is used to include chloro and bromo substituted alkyl groups of 1 to 6 carbon atoms such as chloromethyl, 2-bromoethyl and the like. The term haloalkaryl is used to describe chloro and bromo substituted groups such as 4(2-chloroethyl)phenyl-, 4(3-bromopropyl)phenyl- and the like. The term alkylhaloaryl is used to include alkyl bromo or chloroaryl groups such as 2-ethyl-4-bromophenyl-4-methyl-2-chlorophenyl, 2-methyl-6-chlorophenyl and the like. The term haloalkylhaloaryl is used to include groups such as 4-(2-chloroethyl)-2-bromophenyl 2-(4-n-bromobutyl)-6-chlorophenyl and the like. The term arylhaloalkyl, is used to include groups such as 2-phenyl-3-chloropropyl-, 1-phenyl-2-bromopropyl- and the like. The term haloarylhaloalkyl was used to include groups such as 2(4-chlorophenyl)-3-chloropropyl-, 2(3-bromophenyl)-2-bromoethyl- and the like.

Formula II includes compounds such as monochoroacetaldehyde; monochloroacetone; 1,3-dichloroacetone; monohydroxyacetone; 1,3-dihydroxyacetone; 1-bromo-2-butanone; 1-chloro-2-pentanone; 1,2,2-triethoxypropane; 1,1,2-trimethoxyethane; 4-chlorophenoxyacetaldehyde; alpha, 4-dihydroxyacetophenone; which may be used as such or in the form of their acetals, ketals, hemiacetals and hemiketals.

The reaction may be carried out with or without a solvent. If a solvent is employed, suitable solvents include acetic acid, acetic anhydride, methylene chloride and the like. The reaction is acid catalyzed and both Lewis acids and protic acids may be used. Temperatures of about 0°–80° C. are preferred.

The reaction is best carried out be utilizing the phenolic reactant in an excess of the stoichiometic amount required to form the desired polyphenolic compound. In the case of the reaction with a mono a-haloalkylcarbonyl compound and a phenol it is understood that a triphenol will be obtained and with a di-haloalkylcarbonyl compound and a phenol a tetraphenol will be obtained.

Purification and recovery of the novel poly phenolic compounds can be carried by methods known to those skilled in the art. In particular, recrystallization may be carried out using methylene chloride, benzene, cyclohexane, methanol, ethanol and alcohol-water mixtures. Elution chromatography may also be used over alumina or silica using a variety of solvents as eluants. The polyphenolic compounds produced by the process of the invention may; be used for the preparation of branched polycarbonates.

The polyphenols that have chlorine or bromine can also be prepared by direct halogenation, in solution or suspension, of the corresponding non-halogenated polyphenols. Methylene chloride, chloroform, acetic acid, water, other nonreactive liquids and aqueous sodium hydroxide solution may be used as solvents or dispersants. The degree of halogenation can readily be followed by gas or liquid chromatography, ir or proton nmr.

The phenolic moieties on the invention's novel compounds may be similarly substituted or they may be "mixed", i.e., one or more of these moieties may have different substituents. One paticularly convenient method of preparing mixed polyphenolic compounds of the present invention is to react a precursor with a mixture of phenols to thereby form a mixed polyphenol compound.

Purification, of the polyphenolic compounds can be carried out by recrystallization, elution chromatography, or other methods known to those skilled in the art. Preferred solvents of recrystallization are methylene chloride, benzene, cyclohexane, methanol, ethanol and alcohol-water mixtures. Elution chromatography is carried our best over alumina or silica, using a variety of solvents as eluants.

It is readily apparent that the modes in which the polyphenolic compounds are synthesized may result in isomeric mixtures due to the fact that phenolic compounds are capable of reacting preferably at the carbon that is ortho or para to the phenolic hydroxyl group. The halogenated polyphenolic compounds may also be present as mixtures if an isomeric mixture of polyphenolic compounds is used as a starting material and/or the mixture of isomers that result from the halogenation of even a pure polyphenolic isomer.

The polyphenols may be prepared in a pure form for use as branching agents for polycarbonates or if desired, isomeric mixtures of these branching agents may be employed alone or with other branching agents.

The polyphenols of the instant invention may be used to make novel branched aromatic polycarbonates having an IV of about 0.3 to 1.0 dl/g as measured in methylene chloride at 25° C. These branched polycarbonates are substantially free of crosslinking.

In the preparation of the novel thermoplastic randomly branched polycarbonates of this invention, the amount of the tetraphenolic compound which is reacted with the dihydric phenol and the carbonate precursor is critical to the extent that the amount employed must be sufficient to produce a true thermoplastic randomly branched polycarbonate which is substantially free of crosslinking. If an amount of polyphenolic compound employed is less than 0.01 mole percent, based upon the moles of the dihydric phenol employed, the resulting polymer will not exhibit the degree of non-Newtonian melt characteristics desired for blow molding and/or melt extrusion purposes. Preferably, it is desirable to employ 0.01 to about 3.0 and more particularly, 0.01–1.0 mole percent of the polyphenolic compound, based upon the total moles of dihydric phenol.

The dihydric phenols that can be employed in the practice of this invention include bis(4-hydroxyphenyl)methane, 1,1-bis(4-hydroxyphenyl)ethane, 2,2-bis(4-hydroxyphenyl)propane, also called bisphenol-A or BPA, 2,2-bis(4-hydroxy-3-methylphenyl)propane, 3,3-bis(4-hydroxyphenyl)pentane, 2,2-bis(4-hydroxy-3-chlorophenyl)propane, 2,2-bis(4-hydroxy-3,5-dibromophenyl)propane, 1,1-bis(4-hydroxyphenyl)cyclohexane, p,p'-dihydroxydiphenyl, 3,3'-dichloro-4,4'-dihydroxydiphenyl, bis(4-hydroxyphenyl)ether, bis(4-hydroxyphenyl)sulfone, bis(3,5-dimethyl-4-hydroxyphenyl)sulfone, resorcinol, hydroquinone; 1,4-hydroxy-2,5-dichlorobenzene, 1,4-dihydroxy-3-methylbenzene, bis(4-hydroxyphenyl)sulfoxide, bis(4-hydroxyphenyl)sulfide, bis(3,5-dimethyl-4-hydroxyphenyl)sulfoxide, and the like. A variety of additional dihydric phenols can also be employed such as are disclosed in U.S. Pat. Nos. 2,999,835; 3,028,365 and 3,153,008. It is, of course, possible to employ two or more different dihydric phenols or a copolymer of a dihydric phenol with glycol or with hydroxy or acid terminated polyester, or with one or more dibasic acids in the event a polycarbonate copolymer or copolyestercarbonate rather than a homopolymer is desired for use in the preparation of the branched polymers of this invention. The preferred dihydric phenol is bisphenol-A.

The carbonate precursor employed can be either a carbonyl halide, a haloformate or a diaryl carbonate. Thus the carbonyl halides can be carbonyl chloride, carbonyl bromide, and mixtures thereof. The haloformates suitable for use include mono- or bishaloformates of dihydric phenols (bischloroformates of hydroquinone, monochloroformate of bisphenol-A, etc.) or bishaloformates of glycols (bishaloformates of ethylene glycol, neopentyl glycol, polyethylene glycol, etc.). When using bishaloformates, equimolar amounts of free dihydric phenols are required to effect polymerization. When polymerizing monohaloformates of diphenols no free diphenol is required. While other carbonate precursors will occur to those skilled in the art, carbonyl chloride, also known as phosgene is preferred.

The polymerization of dihydric phenols to high molecular weight polycarbonates may be carried out by an conventional method known in the art. For example, phosgene can be introduced into a solution of the diphenol in organic bases, such as pyridine, triethylamine, dimethylaniline or into solutions of the diphenol in suitable organic solvents, such as benzene, toluene, chlorobenzene, methylene chloride, carbon tetrachloride and the like, with the addition of acid binding agents.

In the most widely practiced polymerization process phosgene is introduced into an aqueous solution of the alkali metal salt of the diphenol in the presence of methylene chloride and a phase-transfer catalyst as well as a molecular weight regulator, usually a monofunctional phenol. One advantage of the instant invention is that the polyphenolic branching agent has the same reactivity profile as the diphenol used to make the linear chains, hence it can be added, in the desired amount, not only later but together with the diphenol at the beginning of the polymerization process. In other words, the polyphenolic compounds can be formulated directly into the reaction mixture to be polymerized to branched polycarbonates.

The reaction between the halogen containing carbonate precursor and the dihydric phenol and the polyphenolic branching agent when carried out by the interfacial method in accordance with this invention is conducted in the presence of an inert organic solvent which is essentially immiscible with water and does not deleteriously affect the formed polymer. Examples of suitable organic solvents ae methylene chloride, ethylene dichloride and chlorobenzene.

In a preferred variant of the polymerization process, the branching polyphenol is added in the form of an aqueous solution of its alkali metal salt. This is possible since the novel polyphenols of the instant invention are capable of forming stable aqueous solutions in the form of their alkali salts. The novel branching agent may also be formulated into the reaction mixture of the dihydric phenol to be polymerized in finely divided solid form or as a methylene chloride solution or slurry. In either form it is copolymerized readily in the polycarbonate forming process and becomes a fully incorporated segment.

The alkali metal hydroxide which can be employed in the polymerization process can be any of the alkali metal hydroxides selected from the groups consisting of the alkali group and the alkaline earth groups. Specifically, these include potassium hydroxide, sodium hydroxide, lithium hydroxide, calcium hydroxide, magnesium hydroxide and the like.

The interfacial, or phase transfer catalysts, which can be employed in the polymerization process can be any of the suitable catalysts that aid the polymerization of dihydric phenols with phosgene. Suitable catalysts include tertiary amines such as triethylamine, tripropylamine, N,N-dimethylaniline and the like; quaternary ammonium compounds such as tetraethylammonium chloride, cetyl triethyl ammonium bromide, tetra-n-heptylammonium iodide, tetra-n-propyl ammonium chloride tetramethylammonium chloride, tetramethylammonium hydroxide, tetra-n-butylammonium iodide, benzyltrimethylammonium chloride and the like; and quaternary phosphonium compounds such as n-butyl-triphenyl and phosphonium bromide and tetrabutyl phosphonium chloride and the like.

The molecular weight regulators which can be employed in the interfacial process include monohydric phenols such as phenol, chroman-I [4-(2,4,4-trimethyl-chromanyl)phenol], p-t-butyl phenol, p-cumyl phenol, an the like. Preferably, phenol or p-tert-butyl phenol are employed as the molecular weight regulator. An effective amount of a molecular weight regulator that will give modified melt flow value (KI) of 1,000 to 50,000 centiseconds, preferably from 5,000 to 30,000 centiseconds may be used. Generally, it is preferred to use from 2-5 mol%, and more preferably from 2.5-4.5 d mol% of phenol as the molecular weight regulator.

It is sometimes desirable to introduce reducing agents, such as sodium dithionite into the aqueous system in order to supress the formation of colored contaminants.

The aqueous interfacial polymerization method may be carried out at temperatures from ambient to about 50° C. However, higher temperatures are within the scope of this invention since the instant method is not temperature dependent.

The diphenol-polyphenol mixture can be converted into branched polycarbonates also by esterification with dialkyl, alkylaryl or diaryl carbonates at elevated temperatures from about 50° C. to about 325° C., at atmospheric or at reduced pressure, in neat form, or in the presence of neutral diluents or in the presence of transesterification catalysts, such as metal oxides, hydroxides, carbonates and the like, as known in the art. When using aryl carbonates, phenols are generated in the transesterification process, so that no molecular weight regulators need be added to the reaction mixture. In fact the degree of polymerization is controlled by the extent of removal of the monohydroxylic coproducts, such as alcohols or phenols.

The branched polycarbonates, when produced according to the instant invention by the interfacial polymerization technique, were recovered from the washed, neutral methylene chloride phase by steam precipitation and drying and were fed into an extruder operating at 265° C. and the extrudates were comminuted into pellets. When prepared by the transesterification method, the polycarbonate melt was directly converted into extrudate and pellets.

While some of the physical-mechanical measurements can be carried out directly with the polycarbonate powder or pellets, some tests require molded specimens. To provide these, the pellets are injection molded at about 315° C., into test bars according to the dimensions required by the test method, such as the notched Izod impact test carried out according to ASTM D-256.

The following test procedures were utilized:

Intrinsic viscosity (I.V.) was determined in methylene chloride solution at 25° C. and is given as deciliters per gram (dl/g).

Molecular weight determinations (number average, $M_n$; weight average, $M_w$ and Z-average, $M_z$), were carried out on Waters Associates GPC Model 200, in methylene chloride solution.

Modified melt flow (K.I.) values, expressed in centiseconds, were obtained by an automated ASTM D-1238 procedure at 300° C. on a Tinius Olsen Melt Indexer, Model T-3, Condition 0.

Melt index ratio (M.I.R.), which is the ratio of melt flow rates at two different shear levels, and is a measure of the non-Newtonian property of the polymer, was obtained on the Tinius Olsen Melt Indexer described above. The M.I.R. values of linear Newtonian polycarbonates are typically less than 1.4, while those of the branched polycarbonates are typically higher than 1.5.

The branched polycarbonates produced according to the instant invention are soluble in selected organic solvents and can be worked into shaped articles from solutions, such as into films. Being thermoplastic, these branched polycarbonates, can be easily fabricated by conventional shaping methods from melt, such as by extrusion, molding, blow-molding, lamination and the like.

The branched polycarbonates of the invention may be combined with other polycarbonates or with thermoplastic polyesters such as polyethylene terephthalate or poly (1,4-butylene terephthalate). In addition, these branched polycarbonates may be combined with reinforcing fillers such as filamentous glass or with non-reinforcing fillers, mold release agents, flame retardants, impact modifiers, extrusion aids, light stabilizers, flame retardants, foaming agents, such as those disclosed in U.S. Pat. No. 4,263,409 and Ger. Offen. No. 2,400,086 which are incorporated by reference and the like if desired.

DESCRIPTION OF THE PREFERRED EMBODIMENTS

The following examples are set forth to illustrate the invention and are not to be construed to limit the scope of the invention.

EXAMPLE 1

A round bottomed, 3 neck flask was used to dissolve 55.5 g (0.6 mol) of chloroacetone in 564.0 g (6 mols) of melted phenol. Hydrogen chloride gas was sparged into the reaction mixture while the reaction mixture was kept between 30°-48° C. with vigorous stirring. The hydrogen chloride was stripped off and crystals of 1,1,2-tris(4-hydroxyphenyl)propane were separated by vacuum filtration. The crystals were washed with methylene chloride and air dired on paper to yield 71.6 g of product. An additional amount of triphenol was obtained after the phenol was stripped off. Recrystallization from aqueous methanol yielded white crystals of m.p. 215°-216.5° C.

EXAMPLE 2

Using the procedure of Example 1, the compound 1,1,2,3-tetrakis-(3,5-dimethyl-4-hydroxyphenyl)propane was made from 2,6-xylenol and 1,3-di-chloroacetone. This tetraphenolic compound had a m.p. of 220.5–221.5° C., a gc emergence time of 32.6 min. (ref p-cumylphenol 14.7 min.)

EXAMPLE 3

Using the procedure of Example 1, the compound 1,1,2,3-tetrakis-(4-hydroxyphenyl)propane, was made from 1,3-dichloroacetone and phenol. This tetraphenolic compound had a gc emergence time of 30.8 min (reference compound-p-cumylphenol 14.8 min.).

EXAMPLE 4

Using the procedure of Example 1, the compound 1,1,2,3-tetrakis(3-methyl-4-hydroxyphenyl)propane was made from o-cresol and 1,3-dichloroacetone. It had an mp of about 145° C. and a gc emergence time of 31.1 min.(reference compound p-cumylphenol 14.8 min.).

EXAMPLE 5

A portion of the 1,1,2,3-tetrakis(3-methyl-4-phenyl) propane (0.5 mol%) was dissolved in aqueous sodium hydroxide and added to 114.0 g of bisphenol-A in a four necked, two liter flask that was equipped with a stirrer, thermometer, phosgene inlet tube and a reflux condenser that was connected to a caustic scrubber. In addition 1.4 ml of triethylamine; 1.5 g of phenol; 400 ml of methylene chloride and 300 ml of water was present in the flask. Phosgene was sparged into the flask at a rate of 1.0 g/minute for about 60 minutes while the pH was automatically maintained at about 11.4. The branched polycarbonate polymer had a KI of about 17,220 and an MIR of about 1.9.

EXAMPLE 6

Using the procedure of Example 4, 0.5 mol% of 1,1,2,3-tetrakis-(4-hydroxyphenyl)propane was used to prepare a branched polycarbonate polymer. That polymer had a KI of 34,350 and an MIR of 3.6.

We claim:

1. A tetraphenolic compound of the formula:

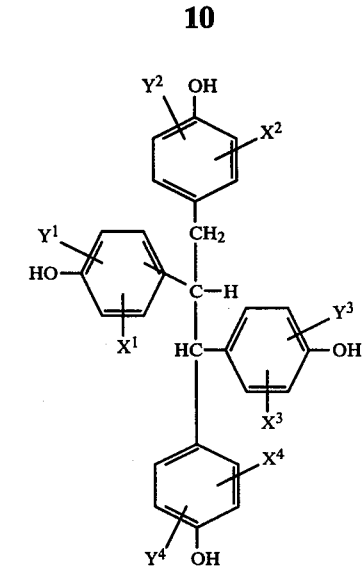

wherein $X^1$, $X^2$, $X^3$, $X^4$, $Y^1$, $Y^2$, $Y^3$, and $Y^4$, are independently selected from hydrogen, chlorine, bromine, and alkyl of from 1 to 6 carbon atoms or aryl.

2. A compound as defined in claim 1 wherein the tetraphenolic compound is of the formula:

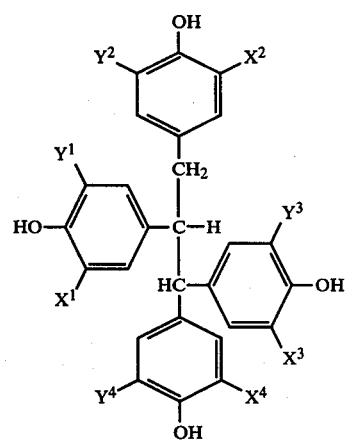

where $X^1$, $X^2$, $X^3$, $X^4$, $Y^1$, $Y^2$, $Y^3$, and $Y^4$, are independently selected from the group consisting of hydrogen, chlorine, bromine and alkyl of from 1 to 6 carbon atoms or aryl.

3. A compound as defined in claim 2, which is 1,1,2,3-tetrakis(3,5-dimethyl-4-hydroxyphenyl)propane.

4. A compound as defined in claim 2 which is 1,1,2,3-tetrakis-(4-hydroxyphenyl)propane.

5. A compound as defined in claim 2 which is 1,1,2,3-tetrakis(3-methyl-4-hydroxyphenyl)propane.

* * * * *